United States Patent
Arcella et al.

(10) Patent No.: US 9,090,794 B2
(45) Date of Patent: Jul. 28, 2015

(54) PVDF COATING COMPOSITION

(75) Inventors: Vincenzo Arcella, Nerviano (IT); Eliana Ieva, Alessandria (IT); Shiow-Ching Lin, Lawrenceville, NJ (US); Marco Avataneo, Milan (IT); Giuseppe Marchionni, Milan (IT)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 13/697,744

(22) PCT Filed: May 19, 2011

(86) PCT No.: PCT/EP2011/058094
§ 371 (c)(1),
(2), (4) Date: Nov. 13, 2012

(87) PCT Pub. No.: WO2011/144681
PCT Pub. Date: Nov. 24, 2011

(65) Prior Publication Data
US 2013/0059961 A1  Mar. 7, 2013

Related U.S. Application Data

(60) Provisional application No. 61/346,177, filed on May 19, 2010.

(51) Int. Cl.

| | |
|---|---|
| *C08K 9/10* | (2006.01) |
| *C08K 9/06* | (2006.01) |
| *C08K 3/04* | (2006.01) |
| *C09D 127/16* | (2006.01) |
| *C09C 1/30* | (2006.01) |
| *C09C 1/36* | (2006.01) |
| *C09C 3/08* | (2006.01) |
| *C09C 3/10* | (2006.01) |
| *C09C 3/12* | (2006.01) |
| *B82Y 30/00* | (2011.01) |
| *C08K 9/08* | (2006.01) |
| *C08L 33/00* | (2006.01) |
| *C08K 3/32* | (2006.01) |

(52) U.S. Cl.
CPC .............. *C09D 127/16* (2013.01); *B82Y 30/00* (2013.01); *C09C 1/3063* (2013.01); *C09C 1/3072* (2013.01); *C09C 1/3081* (2013.01); *C09C 1/3669* (2013.01); *C09C 1/3676* (2013.01); *C09C 1/3684* (2013.01); *C09C 3/08* (2013.01); *C09C 3/10* (2013.01); *C09C 3/12* (2013.01); *C01P 2004/61* (2013.01); *C01P 2004/62* (2013.01); *C01P 2004/64* (2013.01); *C01P 2006/12* (2013.01); *C08K 3/32* (2013.01); *C08K 9/08* (2013.01); *C08L 33/00* (2013.01)

(58) Field of Classification Search
USPC .............................. 524/505; 523/205; 427/221
See application file for complete search history.

(56) References Cited

U.S. PATENT DOCUMENTS

| 4,328,151 A * | 5/1982 | Robinson ...................... 523/205 |
|---|---|---|
| 7,208,134 B2 * | 4/2007 | Bromberg et al. .......... 423/592.1 |
| 2006/0004126 A1 * | 1/2006 | Park et al. ..................... 523/212 |

FOREIGN PATENT DOCUMENTS

| WO | WO 0162857 A1 | 8/2001 |
|---|---|---|
| WO | WO-2006/036397 A1 * | 4/2006 |
| WO | WO 2006036397 A1 | 4/2006 |
| WO | WO-2008/065163 A1 * | 6/2008 |
| WO | WO-2008/065164 A1 * | 6/2008 |
| WO | WO-2008/065165 A1 * | 6/2008 |
| WO | WO 2008065163 A1 | 6/2008 |
| WO | WO 2008065164 A1 | 6/2008 |
| WO | WO 2008065165 A1 | 6/2008 |

* cited by examiner

Primary Examiner — Peter D Mulcahy
Assistant Examiner — Henry Hu

(57) ABSTRACT

A composition comprising at least one vinylidene fluoride (VDF) polymer [polymer (F)]; and inorganic particles at least partially coated with at least one perfluoropolyether block copolymer [polymer (E)] comprising: A) one or more (per) fluoropolyoxyalkylene segment (chain $R_f$), comprising recurring units having at least one catenary ether bond and at least one fluorocarbon moiety, and B) one or more polyalkylene segment (chain $R_a$) comprising recurring units of formula: —$(CR_1R_2$—$CR_3R_4)$—, wherein $R_1$, $R_2$, $R_3$, $R_4$, equal to or different from each other, are selected from the group consisting of H, halogens (preferably F, Cl); $C_1$-$C_6$ (hydro)carbon groups, optionally containing fluorine or other heteroatoms, referably perfluoroalkyl or (per)fluorooxyalkyl. The invention also discloses a method of coating various substrates using said composition.

11 Claims, No Drawings

PVDF COATING COMPOSITION

CROSS-REFERENCE TO RELATED APPLICATIONS

This application is a U.S. national stage entry under 35 U.S.C. §371 of International Application No. PCT/EP2011/058094 filed May 19, 2011, which claims priority to U.S. provisional application No. 61/346177 filed on May 19, 2010, the whole content of this application being incorporated herein by reference for all purposes.

TECHNICAL FIELD

The invention pertains to a PVDF coating composition having improved gloss, and to the use of the same for coating, in particular for architectural coating.

BACKGROUND ART

It is generally understood that, for a polymer blend to be useful as a coating material, outstanding performances with respect to several criteria including optical behaviour (e.g. gloss and weatherability), hardness, abrasion resistance, no dirtiness, etc. are required.

Vinylidene fluoride (VDF) polymers, possessing unique properties such as exceptional weathering resistance, good abrasion resistance, high mechanical strength and toughness, etc., have been used as base material for coatings, and more particularly for highly weatherable architectural coatings for years. For improving adhesion to substrates, pigment dispersion ability and increasing coating gloss, miscible VDF polymer blends with (meth)acrylic resins have been developed. As optical behaviour of a coating, including e.g. gloss, typically requires coating matrix continuity, thermodynamically miscible blends are preferred, especially for exterior architectural finish applications. Said miscibility also allows the final coating to maximize coating weatherability in long term exterior service.

In view of the above, blends of VDF polymers and (meth)acrylic resin at around a 70:30 weight ratio have been proven to provide optimum material performance with respect to criteria such as adhesion, toughness and optical clarity.

Nevertheless, there is still a need in the art for improving appearance of coatings obtained from VDF polymer compositions, including improving their gloss and stain repellence.

This having said, it is worth mentioning that document WO 2008/065164 (SOLVAY SOLEXIS S.P.A.) May 6, 2008 discloses compositions comprising VDF polymers and certain block copolymers comprising a PFPE block and a further block derived from polyaddition polymerization of ethylenically unsaturated monomers, e.g. tetrafluoroethylene. Nevertheless, such block copolymers are merely used as lubricating additives, conferring to the VDF polymer an improved processability, in particular lower pressure and/or lower torque in extrusion. Nowhere in this document, is mention made of the suitability of these additives in coating compositions.

DISCLOSURE OF INVENTION

The invention thus provides for a composition comprising:
at least one vinylidene fluoride (VDF) polymer [polymer (F)]; and
inorganic particles at least partially coated with at least one perfluoropolyether block copolymer [polymer (E)] comprising:

A) one or more (per)fluoropolyoxyalkylene segment (chain $R_f$), that is to say a segment comprising recurring units having at least one catenary ether bond and at least one fluorocarbon moiety, and
B) one or more polyalkylene segment (chain $R_a$) comprising recurring units of formula: —$(CR_1R_2$—$CR_3R_4)$—
wherein $R_1$, $R_2$, $R_3$, $R_4$, equal to or different from each other, are selected from the group consisting of H, halogens (preferably F, Cl); $C_1$-$C_6$ (hydro)carbon groups, optionally containing fluorine or other heteroatoms, preferably perfluoroalkyl or (per)fluorooxyalkyl.

The Applicant has surprisingly found that by means of the addition of inorganic particles coated with the perfluoropolyether block copolymer as detailed above, it is advantageously possible to obtain a composition based on a VDF polymer which would provide for coatings having an improved gloss and/or having increased hydrophobic properties at the surface yielding finally improved stain resistance.

The introduction of the polymer (E) in the composition as a coating onto the inorganic particles enables excellent dispersion in the composition, so as to obtain an even distribution of the at least partially coated particles throughout the coating layer, even in case wherein said polymer (E) would be, in its bare form, available in a rubbery or oily form which would be otherwise hardly efficiently dispersed either in liquid or in powder coatings mixtures.

As used within the frame of the present invention, the term "particle" is intended to denote a mass of material that has a definite three-dimensional volume and shape, characterized by three dimensions.

The vinylidene fluoride polymer [polymer (F)] is preferably a polymer comprising:

(a') at least 60% by moles, preferably at least 75% by moles, more preferably 85% by moles of vinylidene fluoride (VDF);

(b') optionally from 0.1 to 15%, preferably from 0.1 to 12%, more preferably from 0.1 to 10% by moles of a fluorinated monomer different from VDF; said fluorinate monomer being preferably selected in the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom; and (c') optionally from 0.1 to 5%, by moles, preferably 0.1 to 3% by moles, more preferably 0.1 to 1% by moles, based on the total amount of monomers (a') and (b'), of one or more hydrogenated comonomer(s).

The vinylidene fluoride polymer [polymer (F)] is more preferably a polymer consisting of:

(a') at least 60% by moles, preferably at least 75% by moles, more preferably 85% by moles of vinylidene fluoride (VDF);

(b') optionally from 0.1 to 15%, preferably from 0.1 to 12%, more preferably from 0.1 to 10% by moles of a fluorinated monomer different from VDF; said fluorinate monomer being preferably selected in the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom.

As non limitative examples of the VDF polymers useful in the present invention, mention can be notably made of homopolymer of VDF, VDF/TFE copolymer, VDF/TFE/HFP copolymer, VDF/TFE/CTFE copolymer, VDF/TFE/TrFE copolymer, VDF/CTFE copolymer, VDF/HFP copolymer, VDF/TFE/HFP/CTFE copolymer and the like.

VDF homopolymer is particularly advantageous for the compositions of the invention.

The melt viscosity of the VDF polymer measured at 232° C. and 100 sec$^{-1}$ of shear rate according to ASTM D3835 is advantageously at least 5 kpoise, preferably at least 10 kpoise.

The melt viscosity of the VDF polymer measured at 232° C. and 100 sec$^{-1}$ of shear rate is advantageously at most 60 kpoise, preferably at most 40 kpoise, more preferably at most 35 kpoise.

The melt viscosity of VDF polymer is measured in accordance with ASTM test No. D3835, run at 232° C., under a shear rate of 100 sec$^{-1}$.

The VDF polymer has a melting point of advantageously at least 120° C., preferably at least 125° C., more preferably at least 130° C.

The VDF polymer has a melting point advantageously of at most 190° C., preferably at most 185° C., more preferably at most 170° C.

The melting point ($T_{m2}$) can be determined by DSC, at a heating rate of 10° C./min, according to ASTM D 3418.

One example of a commercially available PVDF, which is particularly suitable for use in the present composition, is HYLAR® 5000 PVDF (available from Solvay Solexis Inc.).

The choice of the inorganic particles is not particularly critical; it is generally understood that inorganic particles which remain inert during VDF polymer processing and use are preferred. Non limitative examples of particles which can be used are notably particles of metal oxides, metal carbonates, metal sulphates and the like. Metal oxides are generally selected among Si, Zr, and Ti oxides and mixed oxide comprising these metals in combination with one or more other metal(s) or non metal(s); e.g. silica, alumina, zirconia, alumino-silicates (including natural and synthetic clays), zirconates and the like. Metal carbonates are typically selected from the group consisting of alkaline and alkaline earth metal carbonates, e.g. Ca, Mg, Ba, Sr carbonates. Metal sulphates are generally selected among alkaline and alkaline earth metal sulphates, including Ca, Mg, Ba, Sr sulphates. A metal sulphate which has provided particularly good result is barium sulphate.

To the aim of maximizing the interactions between polymer (E) and inorganic particles, it is generally preferred to use particles having small particle sizes and high specific surface area.

Thus, the inorganic particles (before coating with polymer (E)) generally have a specific area, as determined by BET method according to ISO 9277 standard of advantageously 1 to 500, preferably of 5 to 300, more preferably of 10 to 150.

The inorganic particles (before coating with polymer (E)) generally have an average particles size of 0.001 µm to 1000 µm, preferably of 0.01 µm to 800 µm, more preferably of 0.01 µm to 500 µm.

To the aim of maximizing surface area and interfaces with the host VDF polymer, inorganic particles having nanometric dimensions are typically preferred. To this aim, inorganic particles having an averaged particle size comprised from 1 nm to 250 nm, preferably from 5 to 200, more preferably from 10 to 150 are preferably employed.

The inorganic particles are at least partially coated with polymer (E); although the so coated particles are presumed to be core/shell, such structure is merely inferred from the process by which they are made as well as from properties of the particles. It is not known, however, whether the shell layer (i.e. the coating of polymer (E)) is continuous or discontinuous, smooth or hair-like, chemically bound or merely physically surrounding it.

Experimental evidences have been nevertheless collected showing that good results have been obtained when the polymer (E) substantially completely coats the surface of the inorganic particle.

According to a first embodiment of the invention, the polymer (E) has a melting point of less than 135° C.

Composition of this first embodiment is generally endowed with significantly improved surface properties on coatings obtained therefrom, in particular substantially improved hydrophobicity, and ensuring thus better behaviour against dirt.

Without being bound by this theory, the Applicant thinks that when the polymer (E) has a melting point of less than 135° C., substantial melting and possibly migration in the molten state towards surface might occur during processing of VDF polymer coating composition at its typical processing/coalescing temperatures, so that final parts (films, coatings . . . ) are endowed with significantly increased hydrophobicity into the surface.

The melting point ($T_{m2}$) of polymer (E) can be determined by DSC, at a heating rate of 10° C./min, according to ASTM D 3418.

According to a second preferred embodiment of the invention, the polymer (E) has a melting point of at least 135° C.

Addition of inorganic particles at least partially coated with a polymer (E) having a melting point of at least 135° C. typically provides for coating compositions having improved gloss and outstanding finish of surface in coatings obtained therefrom.

According to this second embodiment, polymer (E) has a melting point of preferably at least 140° C., more preferably at least 145° C.

The (per)fluoropolyoxyalkylene segment (chain $R_f$) of polymer (E) is preferably a chain comprising recurring units ($R_1$), said recurring units having general formula: —$(CF_2)_k$—CFZ—O—, wherein k is an integer of from 0 to 3 and Z is selected between a fluorine atom and a $C_1$-$C_6$ perfluoro(oxy)alkyl group.

Chain $R_f$ more preferably complies with formula:

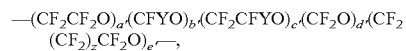

the recurring units being statistically distributed along the (per)fluoropolyoxyalkylene chain, wherein:

Y is a $C_1$-$C_5$ perfluoro(oxy)alkyl group;

z is 1 or 2;

a', b', c', d', e' are integers ≥0.

Most preferably, chain $R_f$ complies with formula:

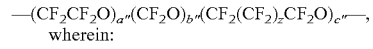
wherein:

z is 1 or 2;

a", b", c" are integers ≥0.

Polymer (E) typically complies with formula:

 (formula I)

wherein:

A=—$(X)_a$—O-A'-$(X')_b$—, wherein A' is a chain $R_f$, as above detailed; X, X', equal to or different from each other, are selected from —$CF_2$—, —$CF_2CF_2$—, —$CF(CF_3)$—; a, b, equal to or different from each other, are integers equal to 0 or 1, with the proviso that the block A linked to the end group $T_f$-O— has a =1 and the block A linked to the end group $T'_f$ has b=0;

B is a segment of recurring units derived from one or more olefins having formula:

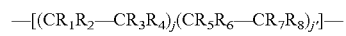 (formula Ia), wherein: j is an integer from 1 to 100, j' is an integer from 0 to 100 with the proviso that (j+j') is higher than 2 and lower than 100; $R_1, R_2, R_3, R_4, R_5, R_6, R_7, R_8$, equal to or different from each other, are selected from halogen (preferably F, Cl); H; $C_1$-$C_6$ groups, optionally containing F or other heteroatoms, preferably perfluoroalkyl or (per)fluorooxyalkyl, said substituents $R_1$-$R_8$ optionally containing one or more functional groups;

z is an integer higher than or equal to 2; z' is ≥0; z, z' are such that the number average molecular weight of the polymer (F) of formula (I) is in the range 500-500,000;

B' is a segment otherwise complying with formula (Ia), but having at least one of the substituents $R_1$ to $R_8$ different than those in block B;

$T_I$ and $T_I'$, equal to or different from each other, are selected from H, halogen, $C_{1-3}$ (per)fluoroalkyls, $C_{1-6}$ alkyls and $C_1$-$C_{30}$ functional end groups comprising heteroatoms chosen among O, S, N.

Said products can be produced by reacting (per)fluoropolyethers comprising peroxide groups with (fluoro)olefins, as detailed in patent application WO 2008/065163 (SOLVAY SOLEXIS S.P.A.) May 6, 2008 and WO 2008/065165 (SOLVAY SOLEXIS S.P.A.).

Preferably, $T_I$ and $T_I'$, equal to or different from each other, are selected from the group consisting of:

(j) —Y', wherein Y' is chain end chosen among —H, halogen, such as —F, —Cl, $C_1$-$C_3$ perhalogenated alkyl group, such as —$CF_3$, —$C_2F_5$, —$CF_2Cl$, —$CF_2CF_2Cl$;

(jj) -$E_r$-$A_q$-$Y''_k$, wherein k, r and q are integers, with q=0 or 1, r=0 or 1, and k between 1 and 4, preferably between 1 and 2, E denotes a functional linking group comprising at least one heteroatom chosen among O, S, N; A denotes a $C_1$-$C_{20}$ bivalent linking group; and Y'' denotes a functional end-group.

The functional group E may comprise an amide, ester, carboxylic, thiocarboxylic, ether, heteroaromatic, sulfide, amine, and/or imine group.

Non limitative examples of functional linking groups E are notably —CONR— (R=H, $C_1$-$C_{15}$ substituted or unsubstituted linear or cyclic aliphatic group, $C_1$-$C_{15}$ substituted or unsubstituted aromatic group); —COO—; —COS—; —CO—; an heteroatom such as —O—; —S—; —NR'— (R=H, $C_1$-$C_{15}$ substituted or unsubstituted linear or cyclic aliphatic group, $C_1$-$C_{15}$ substituted or unsubstituted aromatic group); a 5- or 6-membered aromatic heterocycle containing one or more heteroatoms chosen among N, O, S, the same or different each other, in particular triazines, such as

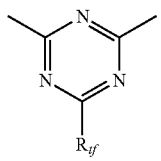

with $R_{tf}$ being a perfluoroalkyl group, e.g. —$CF_3$.

The bivalent $C_1$-$C_{20}$ linking group A is preferably selected from the following classes:

1. linear substituted or unsubstituted $C_1$-$C_{20}$ alkylenic chain, optionally containing heteroatoms in the alkylenic chain; preferably linear aliphatic group comprising moieties of formula —$(CH_2)_m$—, with m integer between 1 and 20, and optionally comprising amide, ester, ether, sulfide, imine groups and mixtures thereof;

2. (alkylene)cycloaliphatic $C_1$-$C_{20}$ groups or (alkylen)aromatic $C_1$-$C_{20}$ groups, optionally containing heteroatoms in the alkylenic chain or in the ring, and optionally comprising amide, ester, ether, sulfide, imine groups and mixtures thereof;

3. linear or branched polyalkylenoxy chains, comprising in particular repeating units selected from: —$CH_2CH_2O$—, —$CH_2CH(CH_3)O$—, —$(CH_2)_3O$—, —$(CH_2)_4O$—, optionally comprising amide, ester, ether, sulfide, imine groups and mixtures thereof.

Examples of suitable functional groups Y'' are notably —OH, —SH, —OR', —SR', —$NH_2$, —NHR', —$NR'_2$, —COOH, —$SiR'_dQ_{3-d}$, —CN, —NCO, epoxy group —($C_2H_3O$—), 1,2- and 1,3-diols as such or as cyclic acetals and ketals (e.g., dioxolanes or dioxanes), —COR', —CH(OCH_3)_2, —CH(OH)CH_2OH, —CH(COOH)_2, —CH(COOR')_2, —CH(CH_2OH)_2, —CH(CH_2NH_2)_2, —PO(OH)_2, —CH(CN)_2, wherein R' is an alkyl, cycloaliphatic or aromatic substituted or unsubstituted group, optionally comprising one or more fluorine atoms, Q is OR', R' having the same meaning as above defined, d is an integer between 0 and 3.

One or more functional end-groups Y'' can be linked to the group A and/or E: for instance, when A is an (alkylen)aromatic $C_1$-$C_{20}$ group, it is possible that two or more Y'' groups are linked to the aromatic ring of the group A.

More preferably, the polymer (E) complies with formula (I) here above, wherein $T_I$ and $T_I'$, equal to or different from each other, are selected from the group consisting of: —H; halogen such as —F and —Cl; $C_1$-$C_3$ perhalogenated alkyl group, such as —$CF_3$, —$C_2F_5$, —$CF_2Cl$, —$CF_2CF_2Cl$; —$CH_2OH$; —$CH_2(OCH_2CH_2)_nOH$ (n being an integer between 1 and 3); —C(O)OH; —C(O)OCH_3; —CONH—$R_H$—OSi(OC_2H_5)_3 (where $R_H$ is a $C_1$-$C_{10}$ alkyl group); —$CONHC_{18}H_{37}$; —$CH_2OCH_2CH(OH)CH_2OH$; —$CH_2O(CH_2CH_2O)_{n*}PO(OH)_2$ (with n* between 1 and 3); and mixtures thereof.

In formula I here above, block B derives from one or more olefins polymerizable by radical route; among those olefins mention can be made of tetrafluoethylene (TFE), ethylene (E), vinylidene fluoride (VDF), chlorotrifluoroethylene (CTFE), hexafluoropropylene (HFP), (per)fluoroalkylvinylethers, (per)fluoroalkoxyalkylvinylethers.

Similarly, block B' derives from one or more olefins polymerizable by radical route, at least one of which is different from olefin(s) of block B. Olefins as above indicated for block B are suitable for being used for block B'.

It is generally preferred that block B and B' (when this latter is present) comprise recurring units derived from perfluorinated olefins.

Particularly preferred to the purpose of the invention is a polymer (E) complying with formula (I) here above, wherein z' is zero, j' is zero and each of $R_1, R_2, R_3, R_4$ are fluorine atoms, that is to say, wherein block B is derived from tetrafluoroethylene and block B' is absent.

Thus, most preferred polymer (E) complies with formula:

wherein:
A=—$(X)_a$—O-A'-$(X')_b$—, wherein X, a and b have the meanings above defined and A' is a chain $R_f$ of formula:

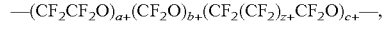

wherein: $z^+$ is 1 or 2; a+, b+, c+ are integers ≥0;
B is a segment of formula —[(CF_2—CF_2)_{j+}]— wherein: j+ is an integer from 2 to 100;
$T_I$ and $T_I'$, equal to or different from each other, are selected from the group consisting of: —H; halogen such as —F and —Cl; $C_1$-$C_3$ perhalogenated alkyl group, such as —$CF_3$, —$C_2F_5$, —$CF_2Cl$, —$CF_2CF_2Cl$.

Inorganic particles at least partially coated with polymer (E) as above detailed can be manufactured by any procedure.

Conventional methods like impregnation or fractional precipitation of polymer (E) from a solution comprising the same by cooling or by addition of a non-solvent in the presence of inorganic particles can be used.

A technique which has been found particularly appropriate is a process wherein:
  polymer (E) as above detailed is solubilized in a liquid medium to obtain a solution;
  inorganic particles are added to said solution to obtain a dispersion; and
  liquid medium is separated by evaporation for recovering inorganic particles at least partially coated with polymer (E).

Liquid media which can be advantageously used are those which enable solubilising polymer (E) in reasonable conditions; among these solvents, mention can be made of (per)fluoropolyether solvents, perfluorinated ethers, perfluorinated amines. As an alternative, supercritical carbon dioxide, having outstanding solubility properties for polymer (E) can be used.

Inorganic particles at least partially coated with polymer (E) as above described and the process for their manufacture are still objects of the present invention.

According to an embodiment of the invention, the composition further comprises at least one treated inorganic filler comprising:
  (a) an inorganic filler; and
  (b) at least one organic surface treatment material selected from an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, and mixtures thereof.

Preferably, said organic surface treatment material is preferably a organo-silane having the general formula $SiR^1R^2R^3R^4$ (I) in which at least one R group of the aforementioned $R^1$, $R^2$, $R^3$, and $R^4$ is a non-hydrolyzable organic group selected from alkyl groups having 1 to 20 carbon atoms, cycloalkyl groups having 4 to 20 carbon atoms, aryl groups having 6 to 20 carbon atoms, or aralkyl groups having 7 to 20 carbon atoms, and at least one of said R groups is a hydrolyzable group selected from the group consisting of alkoxy groups having 2 to 20 carbon atoms, halogens, acetoxy groups having 2 to 20 carbon atoms, and hydroxyl group. The other two R groups are, the same or different, hydrolyzable or non-hydrolyzable as above. It is preferred that at least two, and especially that three, of the R groups are hydrolyzable. The non-hydrolyzable R group can be fully or partially fluorine-substituted. Organo-silanes may be linear or branched, substituted or unsubstituted, and saturated or unsaturated. Typically, non-hydrolyzable R groups are non-reactive. Alkyl, cycloalkyl, aryl, and aralkyl are typical non-hydrolyzable R groups, with alkyl being most typical, including the possibility of any of these groups being fully or partially fluorine substituted. When the hydrolyzable R groups, of the aforementioned $R^1$, $R^2$, $R^3$, and $R^4$ are identical, the organo-silane can be represented by formula: $R^5_x SiR^6_{4-x}$ (II) wherein $R^5$ is non-hydrolyzable and $R^6$ is hydrolyzable as defined above and x is an integer ranging from 1 to 3. Typically $R^6$ includes methoxy, ethoxy, chloro, and hydroxy. Ethoxy is more typical for ease of handling. In certain preferred embodiments, $R^5$ includes fluorine containing alkyl $C_3$-$C_{12}$, either fully fluorinated or partially fluorinated.

Said inorganic filler is selected from the group consisting of an oxide, a mixed oxide, a hydroxide, a sulfide, a carbonate, a sulfate, and mixtures thereof, wherein said inorganic filler typically contains an element selected from Ca, Mg, Ti, Ba, Zn, Zn, Mo, Si, and Al. Preferred inorganic fillers are silica fillers, including fused silica particles, and $TiO_2$ fillers.

While it is generally admitted that treated inorganic fillers have a detrimental effect on gloss in VDF polymer compositions, the Applicant has now surprisingly found that said treated inorganic fillers are added to the composition of the present invention, it is possible to maintain the outstanding gloss properties of the inventive composition, and simultaneously gaining in hydrophobicity or other superficial property conferred by said treated inorganic fillers.

According to a preferred variant of the invention, the composition as above described is a coating composition and/or is used for the manufacture of a coating composition.

Coating composition of the invention generally comprises the inventive composition either at least partially dispersed or at least partially solubilised in a liquid medium.

According to a first embodiment of this variant, the polymer (F) is at least partially dispersed in said liquid medium.

By the term "dispersed" is meant that particles of polymer (F) are stably dispersed in the liquid medium, so that neither settlement into cake nor solvation of the particles does occur during paint preparation and upon storage.

Polymer (F) according to this embodiment is preferably substantially in dispersed form that is to say that more that 90% wt, preferably more than 95% wt, more preferably than 99% wt is dispersed in the liquid medium.

According to this embodiment, the liquid medium comprises at least one organic solvent selected from intermediate and latent solvents for the polymer (F).

An intermediate solvent for the polymer (F) is a solvent which does not dissolve or substantially swell the polymer (F) at 25° C., which solvates polymer (F) at its boiling point, and retains polymer (F) in solvated form, i.e. in solution, upon cooling.

A latent solvent for the polymer (F) is a solvent which does not dissolve or substantially swell polymer (F) at 25° C., which solvates polymer (F) at its boiling point, but on cooling, polymer (F) precipitates.

Latent solvents and intermediate solvents can be used alone or in admixture. Mixtures of one or more than one latent solvent with one or more than one intermediate solvent can be used in this second preferred variant.

Intermediate solvents suitable for the coating composition of this embodiment are notably butyrolactone, isophorone and carbitol acetate.

Latent solvents suitable for the coating composition of this embodiment are notably methyl isobutyl ketone, n-butyl acetate, cyclohexanone, diacetone alcohol, diisobutyl ketone, ethyl acetoacetate, triethyl phosphate, propylene carbonate, triacetin (also known as 1,3-diacetyloxypropan-2-yl acetate), dimethyl phthalate, glycol ethers based on ethylene glycol, diethylene glycol and propylene glycol, and glycol ether acetates based on ethylene glycol, diethylene glycol and propylene glycol.

Non limitative examples of glycol ethers based on ethylene glycol, diethylene glycol and propylene glycol are notably ethylene glycol monomethyl ether, ethylene glycol monoethyl ether, ethylene glycol monopropyl ether, ethylene glycol monobutyl ether, ethylene glycol dimethyl ether, ethylene glycol diethyl ether, ethylene glycol dibutyl ether, diethylene glycol monomethyl ether, diethylene glycol monoethyl ether, diethylene glycol mono-n-butyl ether, propylene glycol methyl ether, propylene glycol dimethyl ether, propylene glycol n-propyl ether.

Non limitative examples of glycol ether acetates based on ethylene glycol, diethylene glycol and propylene glycol are notably ethylene glycol methyl ether acetate, ethylene glycol monoethyl ether acetate, ethylene glycol monobutyl ether acetate, propylene glycol methyl ether acetate.

Non-solvents for polymer (F) such as methanol, hexane, toluene, ethanol and xylene may also be used in combination with latent solvent and/or intermediate solvent for special purpose, e.g. for controlling paint rheology, in particular for spray coating.

Generally, the liquid medium of this embodiment of the invention will
consists essentially of one or more organic solvents selected from latent solvents and intermediate solvents, as above detailed. Minor amounts (e.g. of less than 5% wt, preferably less than 1% wt) of water or other organic solvents might be present in the liquid medium of the composition of this second variant, without this affecting the properties of the coating compositions.

Within this embodiment, polymer (F) can be provided under dispersed form by dispersing a powder of bare polymer (F), generally an agglomerated powder obtained from latex coagulation and drying, in a liquid medium comprising latent and/or intermediate solvent as above detailed; coating composition of the invention can thus be obtained by mixing said polymer (F) in said dispersed form with the inorganic particles at least partially coated with polymer (E), as above defined, and with all other optional ingredients and additives, including, notably treated inorganic filler(s) as above defined.

As an alternative, a pre-mixed powder consisting essentially of polymer (F), of said inorganic particles at least partially coated with polymer (E) and, optionally, of above mentioned treated inorganic filler(s) can be manufactured first and used instead of powder of bare polymer (F) in the process for manufacturing the coating composition, as above detailed.

Said pre-mixed powder is another object of the present invention.

According to this alternative, said pre-mixed powder is generally obtained by mixing in an aqueous phase a powder of bare polymer (F), generally an agglomerated powder obtained from latex coagulation, with said inorganic particles at least partially coated with polymer (E) and optionally with said treated inorganic filler(s), then evaporating the aqueous phase until dryness, at a temperature of at least 50° C., and optionally grinding or sieving the so obtained solid residue in order to obtain a pre-mixed powder, advantageously possessing free-flowing properties.

The choice of the device for dispersing the polymer (F) or the pre-mixed powder in said liquid medium is not particularly limited; high shear mixers or other size-reduction equipment such as high pressure homogenizer, a colloidal mill, a fast pump, a vibratory agitator or an ultrasound device can be used.

Agglomerated powders of polymer (F) particularly suitable for this second variant are composed of primary particles having an average particle size of preferably 200 to 400 nm and are typically under the form of agglomerates having an average particle size distribution of preferably 1 to 100 μm, more preferably of 5 to 50 μm.

According to a second embodiment of this variant of the invention, the polymer (F) is at least partially dissolved in said liquid medium.

By the term "dissolved" is meant that the polymer (F) is present in solubilised form in the liquid medium.

Polymer (F) according to this embodiment is preferably substantially in dissolved form that is to say that more than 90% wt, preferably more than 95% wt, more preferably than 99% wt is dissolved in the liquid medium.

The liquid medium according to this embodiment preferably comprises an organic solvent selected among active solvents for polymer (F).

An active solvent for polymer (F) is a solvent which is able to dissolve at least 5% wt of a polymer (F) (with respect to the total weight of the solution) at a temperature of 25° C.

In this case, it is generally preferred to select an active solvent which will not dissolve the polymer (E), so as to advantageously preserve the structure of the inorganic particles at least partially coated with polymer (E).

Active solvents which can be used in this embodiment are notably acetone, tetrahydrofurane, methyl ethyl ketone, dimethylformamide, dimethylacetamide, tetramethylurea, dimethylsulfoxide, trimethylphosphate, N-methyl-2-pyrrolidone.

The liquid medium of this second embodiment can further comprise one or more of intermediate and/or latent solvents for the polymer (F). Nevertheless, the liquid medium will preferably comprise a major amount of the active solvent.

The coating composition of the invention generally additionally comprise at least one (meth)acrylic polymer [polymer (M)].

Polymer (M) typically comprises recurring units selected from the group of formulae j, jj, jjj of formulae:

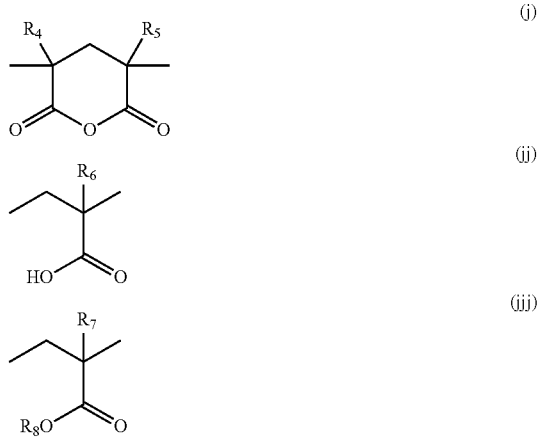

wherein $R_4$, $R_5$, $R_6$, $R_7$, equal to or different from each other are independently H or $C_{1-20}$ alkyl group, $R_8$ is selected from the group consisting of substituted or non substituted, linear or branched, $C_1$-$C_{18}$ alkyl, $C_1$-$C_{18}$ cycloalkyl, $C_1$-$C_{36}$ alkylaryl, $C_1$-$C_{36}$ aryl, $C_1$-$C_{36}$ heterocyclic group.

Preferably, polymer (M) comprises recurring units of formula j, as detailed above. Optionally polymer (M) can comprise additional recurring units different from j, jj, jjj, typically derived from ethylenically unsaturated monomers, such as notably olefins, preferably ethylene, propylene, 1-butene, styrene monomers, such as styrene, alpha-methyl-styrene and the like.

Preferably, polymer (M) is a polymer comprising recurring units derived from one or more than one alkyl (meth)acrylate. A polymer (M) which gave particularly good result within the context of the present invention is a copolymer of methyl methacrylate and ethyl acrylate. This polymer (M) is notably commercially available under trade name PARALOID™ B-44.

Should the coating composition comprise polymer (M), it is generally comprised in the composition of the invention in a weight ratio polymer (M)/polymer (F) of 10/90 to 50/50, preferably of 20/80 to 40/60, more preferably of 25/75 to 35/65.

The coating composition of the invention can further comprise one or more pigments. Pigments useful in the composition of the invention notably include, or will comprise, one or more of the following: titanium dioxide which is available form Whittaker, Clark & Daniels, South Plainfield, N.J., USA; Artic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, USA.; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Englehard Industries, Edison, N.J., USA.

Another object of the invention is the use of the inventive composition as described above for coating substrates.

Coating technique is not particularly limited. All standard coating techniques suitable for coating compositions comprising a liquid medium can be suitable to this aim. Mention can be notably made of spray coating, curtain coating, casting, coil coating and the like.

Techniques particularly adapted for coating substrates with the composition of the invention are notably coil coating or spray coating.

The choice of substrates is not particularly limited; plastic and metal substrates are illustrative examples.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

Raw Materials

Chemically precipitated $BaSO_4$ nanoparticles commercially available from Solvay Bario e Derivati were used; BLANC FIXE NC30 $BaSO_4$ (NC30, hereinafter) possesses a surface area of 30 $m^2/g$ and BLANC FIXE NC50 (NC50, hereinafter) a surface area of 50 $m^2/g$.

Two perfluoropolyether block copolymers manufactured according to the teachings of WO 2008/065163 (SOLVAY SOLEXIS SPA) May 6, 2008 were used; first polymer used (Polymer (E-1), herein below) was a PFPE/TFE block copolymer, characterized by a number averaged molecular weight of each of PFPE blocks of about 25 000 and an average of 26 —$CF_2$— units per block derived from TFE, and an average number of blocks derived from TFE in the copolymer of about 1.5, said block copolymer having a melting point of 230° C. Second polymer used (Polymer (E-2), herein below) was a PFPE/TFE block copolymer, characterized by a number averaged molecular weight of each of PFPE blocks of about 30 000 and an average of 13 —$CF_2$— units per block derived from TFE, and an average number of blocks derived from TFE in the copolymer of about 9.5 said block copolymer having a melting point of 130° C.

Determination of Gloss

Gloss of coatings obtained from coating compositions was evaluated by determining the 60° gloss according to the ASTM D 523-89 standard on coated panels, obtained as below detailed.

Determination of Contact Angle

Water contact angle was determined according to ASTM D7334-08 on coated panels, obtained as below detailed.

General Procedure for the Manufacture of Coated Inorganic Particles

Block copolymer PFPE-TFE as above detailed was dissolved in an GALDEN® perfluoropolyethers HT55 at room temperature so as to obtain 220 g of a solution having a concentration of about 1.5% wt; 30 g of the inorganic powder was then added to the polymer solution and mixed; then, the solvent was removed by evaporation in a rotating evaporator at a temperature of 85° C. under $N_2$ flux (5 Nl/h). Weight ratios and types and amounts of block copolymer and inorganic particles are detailed in table herein below.

TABLE 1

| sample | Inorganic particles | Polymer (E) | % wt polymer (E) | APS (nm) |
|---|---|---|---|---|
| IP-1 | NC-30 | E-1 | 10 | 110 |
| IP-2 | NC-30 | E-2 | 10 | 110 |
| IP-3 | NC-50 | E-1 | 10 | 110 |
| IP-4 | NC-50 | E-2 | 10 | 100 |

General Procedure for the Manufacture of Coating Compositions

In a glass jar coated inorganic particles (25 wt %) and isophorone were charged; then glass beads were added and the mixture was shaked by a mechanical shaker (Red Devil paint shaker) for 6 hours, the mixture was then filtered to remove the glass beads.

Separately, into a glass jar, 100 grams of HYLAR® 5000 PVDF along with 106 gram of an acrylic resin (~40 weight % in toluene) commercially available as Paraloid® B44 from Rohm and Haas, 174 gram of isophorone and 43 grams of Blue 3 pigment from Shepherd were charged. After brief mixing, glass beads were added to this mixture as grinding media. The glass jar was sealed and the mixture was shaked by a mechanical shaker (Red Devil paint shaker) for 2 hours. The standard blue PVDF paint was then filtered with coarse filter to remove glass beads.

Coated inorganic particles, as well as native bare inorganic particles (to the sake of comparison), and blue paint as above described were then mixed in required weight ratios. Ingredients and compositions of formulations prepared are summarized in tables 2 and 3. The so obtained coating compositions were applied on chromated aluminum panels, baked at 250° C. for 10 minute and cooled at room temperature. Coatings were thus evaluated for their gloss according to ASTM D523-89 standard and for their water contact angle according to ASTM D7334-08. Results are also comprised in tables herein below.

TABLE 2

| Component | (*) | 1C | 2C | 3C | 4C | 5C |
|---|---|---|---|---|---|---|
| NC30 | phr | — | 2.84 | 8.52 | — | — |
| NC50 | phr | — | — | — | 2.84 | 8.52 |

TABLE 2-continued

| Component | (*) | 1C | 2C | 3C | 4C | 5C |
|---|---|---|---|---|---|---|
| gloss | (60°) | 34 | 45 | 37 | 47 | 40 |
| WCA (**) | ° | 70.3 | 70.8 | 73.7 | 71.5 | 71.5 |

TABLE 3

| Component | (*) | 6 | 7 | 8 | 9 | 10 | 11 |
|---|---|---|---|---|---|---|---|
| IP-1 | phr | 2.84 | 8.52 | 11.3 | — | — | — |
| IP-2 | phr | — | — | — | 10.55 | — | — |
| IP-3 | phr | — | — | — | — | 2.84 | 8.52 |
| gloss | (60°) | 51 | 49 | 43 | 22 | 52 | 47 |

(*) amount of additives with respect to solids of paint formulation.
(**) WCA = water contact angle Data provided well demonstrate that significant increase in gloss can only be obtained with coated inorganic particles when the block copolymer has a melting point of at least 135° C.; with block copolymer as above detailed having melting point of less than 135° C., no gloss improvement is achieved, but hydrophobicity at the surface is obtained; migration phenomena leading to significant bleeding out of the block copolymer at the surface is shown by high values of contact angle. While a slight increase of gloss can be obtained with bare inorganic particles, only the coated ones with block copolymer according to the invention significantly increase this property, without affecting contact angle.

Coating Compositions Comprising Coated Particles and Treated Fillers.

Coating compositions were manufactured comprising both inorganic particles coated with block copolymer, as above detailed, and certain fluoroalkylalkoxy-silane-modified silica particles. Thus, AEROSIL® 150fumed silica from Degussa were surface modified by treatment with tridecafluorooctyl-triethoxysilane of formula $C_8F_{17}$—$CH_2CH_2$—$Si(OEt)_3$ ($R_F$($C_8$)Et-SiOEt$_2$, hereinafter).

Ingredients used in the coating formulations prepared are detailed in table 4.

The coating compositions so obtained were applied to chromated aluminum panels, baked at 250° C. for 10 minute and cooled at room temperature.

Contact angle and gloss were measured on each panel and the results are reported in table 4.

TABLE 4

| Component | (*) | 1C | 12C | 13 |
|---|---|---|---|---|
| $R_F$($C_8$)Et—SiOEt$_2$/SiO$_2$ | phr | — | 5 | 5 |
| NC30 | phr | — | 5 | — |
| IP-1 | phr | — | — | 5 |
| Gloss | (60°) | 34 | 42 | 46 |
| WCA (**) | ° | 70.3 | 100.6 | 99.0 |

(*) amount of additives with respect to solids of paint formulation.
(**) WCA = water contact angle Data provided well demonstrate that when used in combination with hydrophobicity-imparting additives, particles coated with polymer (E) enable achieving better compromise in WAC/gloss properties.

Combination of hydrophobicity-imparting additives with bare corresponding particles does not provide acceptable gloss at comparable WCA values.

The invention claimed is:

1. A composition comprising:
   at least one vinylidene fluoride (VDF)-containing polymer [polymer (F)]; and
   inorganic particles at least partially coated with at least one perfluoropolyether block copolymer [polymer (E)] comprising:
   A) one or more (per)fluoropolyoxyalkylene block segment (chain $R_f$), said segment comprising recurring units having at least one catenary ether bond and at least one perfluorocarbon moiety, and
   B) one or more polyalkylene block segment (chain $R_a$) comprising recurring units of formula: —($CR_1R_2$—$CR_3R_4$)—
   wherein $R_1$, $R_2$, $R_3$, $R_4$, equal to or different from each other, are selected from the group consisting of H, halogens and; $C_1$-$C_6$ hydrocarbon groups, optionally containing fluorine or other heteroatoms chosen from O, S and N.

2. The composition of claim 1, wherein said polymer (F) is a polymer comprising:
   (a') at least 60% by moles of vinylidene fluoride (VDF);
   (b') optionally from 0.1 to 15% by moles of a fluorinated monomer different from VDF; said fluorinate monomer being selected from the group consisting of vinylfluoride ($VF_1$), chlorotrifluoroethylene (CTFE), hexafluoropropene (HFP), tetrafluoroethylene (TFE), perfluoromethylvinylether (MVE), trifluoroethylene (TrFE) and mixtures therefrom.

3. The composition of claim 1, wherein the inorganic particles are selected from the group consisting of metal oxides, metal carbonates, and metal sulphates.

4. The composition of claim 1, wherein the (per)fluoropolyoxyalkylene block segment (chain $R_f$) of polymer (E) is a chain comprising recurring units ($R_1$), said recurring units having general formula: —($CF_2$)$_k$—CFZ—O—, wherein k is an integer of from 0 to 3 and Z is selected from the group consisting of a fluorine atom and a $C_1$-$C_6$ perfluoro(oxy)alkyl group.

5. The composition of claim 4, wherein the chain $R_f$ of polymer (E) complies with formula:

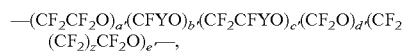
—$(CF_2CF_2O)_{a'}(CFYO)_{b'}(CF_2CFYO)_{c'}(CF_2O)_{d'}(CF_2(CF_2)_zCF_2O)_{e'}$—, the recurring units being statistically distributed along the (per)fluoropolyoxyalkylene chain, wherein:
   Y is a $C_1$-$C_5$ perfluoro(oxy)alkyl group;
   z is 1 or 2; and
   a', b', c', d', e' are integers ≥0.

6. The composition of claim 1, wherein the polymer (E) complies with formula:

$$T_f\text{-}O\text{-}[A\text{-}B]_z\text{-}[A\text{-}B']_{z'}\text{-}A\text{-}T'_f \quad \text{(formula I)}$$

wherein:
   A=—$(X)_a$—O-A'—$(X')_b$—, wherein A' is a chain $R_f$, as defined in claim 1;
   X, X', equal to or different from each other, are selected from the group consisting of —$CF_2$—, —$CF_2CF_2$—, and —$CF(CF_3)$—;
   a, b, equal to or different from each other, are integers equal to 0 or 1, with the proviso that the block A linked to the end group $T_f$—O— has a=1 and the block A linked to the end group $T'_f$ has b=0;
   B is a segment, of recurring units derived from one or more olefins, said segment having formula:

—[$(CR_1R_2$—$CR_3R_4)_j(CR_5R_6$—$CR_7R_8)_{j'}$]— (formula Ia), wherein: j is an integer from 1 to 100, j' is an integer from 0 to 100 with the proviso that (j+j') is higher than 2 and lower than 100; $R_1, R_2, R_3, R_4, R_5, R_6, R_7, R_8$, equal to or different from each other, are selected from the group consisting of halogen; H; $C_1-C_6$ groups, optionally containing F or other heteroatoms, said groups $R_1-R_8$ optionally containing one or more functional groups;

z is an integer higher than or equal to 2; z' is ≥0; z, z' are such that the number average molecular weight of the polymer (E) of formula (I) is in the range 500-500,000;

B' is a segment otherwise complying with formula (Ia), but having at least one of the groups $R_1$ to $R_8$ different than those in block B; and $T_I$ and $T_I'$, equal to or different from each other, are selected from the group consisting of H, halogen, $C_{1-3}$ (per)fluoroalkyls, $C_{1-6}$ alkyls and $C_1-C_{30}$ functional end groups comprising heteroatoms chosen among O, S, N.

7. The composition of claim 6, wherein the polymer (E) complies with formula:

(formula II)

wherein:

A=—$(X)_a$—O-A'—$(X')_b$—, wherein X, a and b have the meanings defined in claim 6 and A' is a chain $R_f$ of formula:

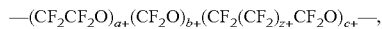

wherein: $z^+$ is 1 or 2; a+, b+, c+ are integers ≥0;

B is a segment of formula —$[(CF_2—CF_2)_{j+}]$— wherein: j+ is an integer from 2 to 100; and $T_I$ and $T_I'$, equal to or different from each other, are selected from the group consisting of: —H; halogen; and $C_1-C_3$ perhalogenated alkyl group.

8. The composition of claim 1, said composition further comprising at least one treated inorganic filler comprising:
(a) an inorganic filler; and
(b) at least one organic surface treatment material selected from the group consisting of an organo-silane, an organo-siloxane, a fluoro-silane, an organo-phosphonate, an organo-acid phosphate, an organo-pyrophosphate, an organo-polyphosphate, an organo-metaphosphate, an organo-phosphinate, an organo-sulfonic compound, a hydrocarbon-based carboxylic acid, an associated ester of a hydrocarbon-based carboxylic acid, a derivative of a hydrocarbon-based carboxylic acid, a hydrocarbon-based amide, a low molecular weight hydrocarbon wax, a low molecular weight polyolefin, a co-polymer of a low molecular weight polyolefin, a hydrocarbon-based polyol, a derivative of a hydrocarbon-based polyol, an alkanolamine, a derivative of an alkanolamine, an organic dispersing agent, and mixtures thereof.

9. A coating composition comprising the composition of claim 1 either at least partially dispersed or at least partially solubilised in a liquid medium.

10. The coating composition of claim 9, said coating composition further comprising at least one (meth)acrylic polymer [polymer (M)] comprising recurring units selected from the group of formulae j, jj, and jjj:

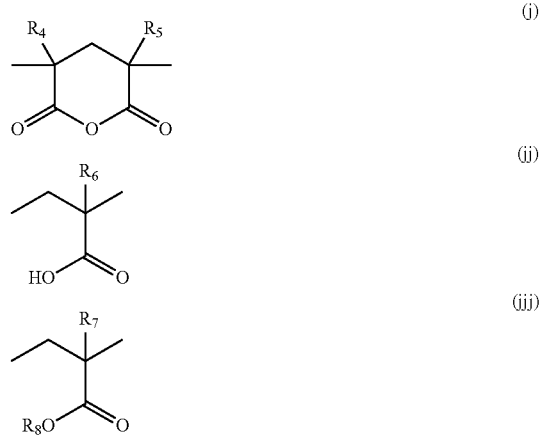

wherein $R_4, R_5, R_6, R_7$, equal to or different from each other are independently H or $C_{1-20}$ alkyl group, $R_8$ is selected from the group consisting of substituted or non substituted, linear or branched, $C_1-C_{18}$ alkyl, $C_1-C_{18}$ cycloalkyl, $C_1-C_{36}$ alkylaryl, $C_1-C_{36}$ aryl, and $C_1-C_{36}$ heterocyclic group.

11. A method of coating substrates comprising using the composition according to claim 1.

* * * * *